Feb. 26, 1952                 E. VROOM                 2,587,014

CHARGE AND TAX DETERMINING EQUIPMENT FOR TELEPHONE SYSTEMS

Filed Dec. 29, 1948                                5 Sheets-Sheet 1

INVENTOR
E. VROOM
BY
*J. W. Schmied*
ATTORNEY

INVENTOR
E. VROOM
BY
J.W.Schmied
ATTORNEY

Feb. 26, 1952 E. VROOM 2,587,014
CHARGE AND TAX DETERMINING EQUIPMENT FOR TELEPHONE SYSTEMS
Filed Dec. 29, 1948 5 Sheets-Sheet 4

INVENTOR
E. VROOM
BY
ATTORNEY

INVENTOR
E. VROOM
BY
J. W. Schmied
ATTORNEY

Patented Feb. 26, 1952

2,587,014

UNITED STATES PATENT OFFICE 2,587,014

CHARGE AND TAX DETERMINING EQUIPMENT FOR TELEPHONE SYSTEMS

Edward Vroom, Ossining, N. Y., assignor to Bell Telephone Laboratories, Incorporated, New York, N. Y., a corporation of New York Application December 29, 1948, Serial No. 67,833

8 Claims. (Cl. 235—61)

This invention relates to telecommunication systems and, more particularly, to a telecommunication system adapted to select and record the charge and federal tax for a completed telephone call.

At some stage in the processing of toll telephone tickets for accounting and billing purposes, it becomes necessary to determine the total charge for each call. In present telephone installations this is commonly accomplished in an accounting center in which clerks, referring to rate books, apply a number of factors which are available regarding each completed call, and compute the charge for the call and ascertain the federal tax to be applied thereto. Such computation is time-consuming and inordinately expensive.

The object of the present invention, therefore, is to enable the complete charge for a connection, and the federal tax thereon, to be automatically, rapidly and accurately determined in monetary values.

In both automatic recording telephone systems and manual toll systems, sufficient data in regard to each call must be available, in some form, from which the final charge may be ascertained. These data either may be recorded on operator toll tickets, or, in an automatic telephone system, may be represented in various register circuits. From these data several general characteristics of each call may be determined including (1) the place of origination of the call; (2) the place called; (3) the class of call, viz., day, night, person-to-person, station-to-station, etc.; and (4) the chargeable time. The present invention relates to means for receiving these characteristics and for then selecting and recording a predetermined charge and federal tax applicable to the call in accordance with the registered characteristics.

For the sake of clarity and simplicity, the embodiment of the invention presented herein discloses a key-set associated with a progress switch by means of which the characteristics of the call may be received, but it is to be understood that the association of the invention with automatic recording telephone systems is contemplated, and it is believed that a person skilled in any of the well-known systems of that type will be able to readily contrive interconnecting circuits whereby a completely automatic determination of the charges may be made.

The proposed means for selecting the proper charge for a telephone connection, and the federal tax to be applied thereto, comprises an electromechanical translator which may be of the type disclosed in the patent application of O. Myers, Serial No. 707,020, filed October 31, 1946, now Patent No. 2,558,577, or the type disclosed in the patent application of E. W. Gent et al., Serial No. 784,024, filed November 4, 1947, although similar translators of other types may be used such as those disclosed in United States Patent 2,361,859, granted October 31, 1944, to R. F. Mallina and Patent 2,364,446, granted December 5, 1944, to F. A. Hubbard. In general, such translators comprise a plurality of input registers, a plurality of output registers, and a plurality of magnetic cards or plates each having a distinctive pattern of serrated edges and a distinctive pattern of perforations. In response to coded designations impressed on the input registers, one of the magnetic cards is selected, and the output registers are then selectively operated under the control of the distinctive pattern of perforations in the selected card, thereby completing the translation. A more complete description of card translators suitable for embodiment in the present invention may be found in the above-cited applications for Letters Patent.

In the depicted embodiment of the invention, a series of digits representing characteristics of the call are successively entered upon a key-set. These digits are then sequentially registered, on a two-out-of-five basis, in the input register of a card translator of the above-discussed type. In the system herein disclosed, two card translators have been used in order to demonstrate the practicability of utilizing a plurality of smaller translators, but it is apparent that a single translator of larger size could be used. It is also to be understood that the use of a two-out-of-five encoding base is purely representative and that other bases might be employed. The characteristics of the call are translated by the card translator or card translators into a series of digits representing the monetary values of charge and tax, and these digits may be recorded on a visual lamp display or on a perforated tape, as shown in detail hereinafter. Thus, the invention provides means whereby an operator may readily and economically ascertain, or, in an automatic system, have readily available, a visual indication of the charge and tax on a call. This information may be entered on a toll ticket and is immediately available if the customer inquires therefor. The invention also provides for entry of the information on a perforated tape for use in automatic toll ticketing systems.

The invention may be more clearly understood from the following detailed description of one embodiment thereof, made in reference to the accompanying drawings in which:

Fig. 6 illustrates the proper orientation of the several figures of the drawing.

It is to be noted that for purposes of clarity only the input and output registers of the card translators have been shown.

Figure 1:
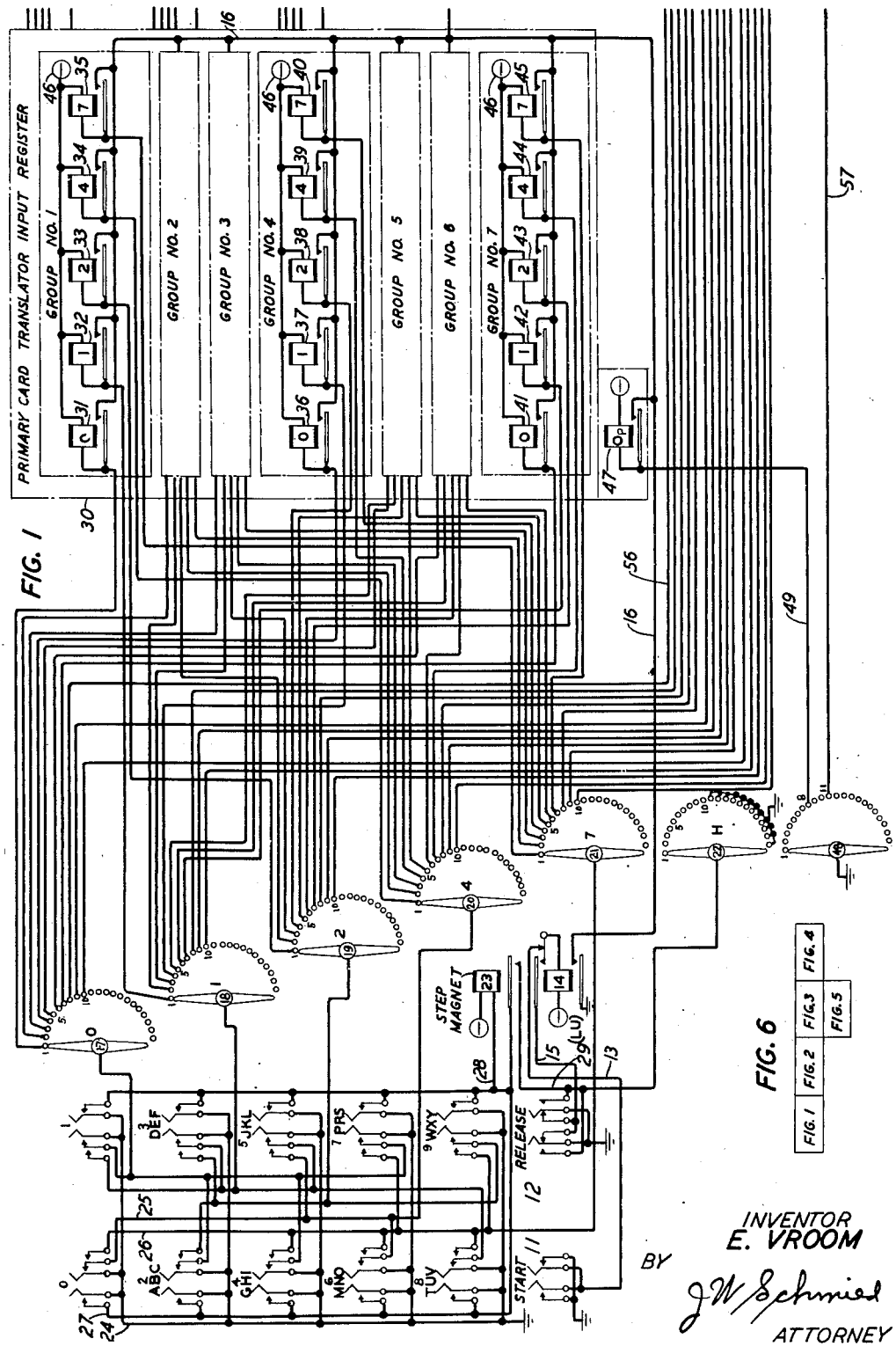
Fig. 1 shows a digit registering key-set, a progress switch, and the primary card translator input register.

Referring now to Fig. 1, the key-set at the left of the drawing comprises a series of ten keys, numbered from 0 to 9, and bearing letter designations coordinated therewith in accordance with the convention in dial systems. The characteristics of a completed call may be represented in any suitable fashion, but for purposes of illustration the following system will be employed:

(1) A two-digit number representing the "zone" and central telephone switching office in which the call originated, i. e., identifying the calling location;

(2) A four-digit number representing the destination of the call, i. e., identifying the called location;

(3) A single digit representing the class of call, viz., day or night, person-to-person, station-to-station;

(4) A three-digit number representing the chargeable time in tenths of minutes, viz., 076 representing 07.6 minutes. It may be noted that the registering of the first six digits establishes the location of the calling and called party, and, therefore, may represent a "base rate," i. e., a basic charge of $0.10, $0.15, $0.20, etc. between each calling and called central office. The registering of the next or seventh digit representing the class of call applies an additional factor which will result in what may be called a "modified" base rate. Under the assumed system, the only additional factor needed to determine the charge and federal tax on a call is the chargeable time, which is represented by the eighth, ninth and tenth digits.

The key-set also includes a "start" key 11 and a "release" key 12. When start key 11 is operated to begin the determination of charge and tax, a circuit is closed from ground, through the contacts of key 11, conductor 13, upper back contacts of lock-up relay 14, winding of relay 14, to battery. Lock-up relay 14, upon operating, completes a locking circuit from battery, winding of relay 14, upper front contacts of relay 14, conductor 15, back contacts of release key 12, to ground. Relay 14 also connects off-normal ground through the lower front contacts of relay 14 to the off-normal ground lead 16.

Each of the operating keys 0–9 is arranged to connect ground to the brush assemblies of certain banks of a conventional progress switch, such as blanks 17—21, and each of the operating keys 0 through 9 is also arranged to connect ground to the progress switch step magnet 23. For example, operation of key 0 closes all contacts associated therewith, thus connecting ground over conductor 24, through the right-hand sets of contacts of key 0, over conductors 25 and 26 to the brush assemblies of the No. 6 progress-switch bank 20 and of the No. 7 progress-switch bank 21. Key 0 also connects ground over conductor 24, through the left-hand set of contacts of key 0, over conductor 27, conductor 28, winding of step magnet 23, to battery. Thus, operation of key 0 connects ground to a certain two of the progress-switch banks and operates step magnet 23. Similarly, operation of key 1 connects ground to the brush assembly of the No. 0 progress switch bank 17 and of the No. 1 progress-switch bank 18, and operates step magnet 23. The remaining keys are similarly arranged to operate the step magnet 23 and to connect ground to two of the progress-switch banks 17—21 in accordance with the conventional two-out-of-five code.

Each of the progress-switch banks 17—21 is provided with a plurality of terminals which are sequentially contacted by the associated non-bridging brush assemblies in the well-known manner. The brush assemblies are stepped one step in the clockwise direction each time the step magnet 23 is released, which occurs each time one of the keys 0–9 is released. Since it has been presumed that a ten-digit code would be used, and since the exemplary progress switch has been shown to have twenty-two contacts per bank, an "H" bank 22 may be provided having terminals No. 11 through No. 22 grounded. With such provision, the progress switch is arranged to return to its normal position, as shown, at the completion of the registration of the tenth digit. As the keys are depressed in accordance with the characteristics of a call, release of the key representing the tenth digit will cause step magnet 23 to once again release which will step all brushes to the eleventh position on their bank thereby bringing the brush of H bank 22 into contact with the grounded No. 11 terminal. Step magnet 23 will then be again operated, this time over a circuit from battery, winding of step magnet 23, conductor 28, back contact of step magnet 23, conductor 29, brush of the H bank 22, and to ground. The resulting operation of step magnet 23 will break this energizing circuit at the back contact of magnet 23, so that magnet 23 will immediately release, stepping each of the brushes one step forward. Release of magnet 23 will reestablish its energizing circuit, and thus the progress switch will be automatically stepped until the brush of the H bank 22 is no longer contacting ground, which will result in the progress switch being reset to its normal condition with each of the brushes contacting its associated No. 1 terminal.

Referring now to the right-hand portion of Fig. 1, a primary card translator input register 30 is represented. As previously indicated, the depicted embodiment of the invention utilizes two card translators which will hereinafter be referred to as the primary and secondary card translators. As may be understood more clearly by reference to the above-cited patent applications, each of these card translators is provided with an input register which may comprise a series of groups of five electromagnets which serve as code bar magnets whereby a certain magnetic card may be selected. Operation of two out of each group of five electromagnets will result in the operation of the associated code bars and in the consequent conditioning of the apparatus by the subsequent movement of but one selected magnetic plate. In the present embodiment of the invention, the first seven digits of the call characteristics are to be translated in the primary card translator and, therefore, the primary card translator input register comprises a series of seven groups of five electromagnets each. Each of the seven digits is registered, on the conventional two-out-of-five code basis, in one of the groups of electromagnets. Since the brushes in all of the banks of the progress switch are initially in contact with their respective No. 1 terminals, as shown in Fig. 1, the No. 1 terminals of each of the operating banks 17—21 are connected to the corresponding magnet in the first group of the primary card translator input register. For example, terminal No. 1 of No. 0 progress switch bank 17 is connected to No. 0 magnet 31 in group No. 1 of the primary card translator input register, terminal No. 1 of the No. 1 bank 18 is connected to the No. 1 magnet 32 in the No. 1 group, terminal No. 1 of the No. 2 bank 19 is connected to the No. 2 magnet 33 in group No. 1, and so on. In order to register the second digit in group No. 2 of the primary card translator input register 30, the No. 2 terminals in each operating bank 17—21 of the progress switch are connected to the corresponding magnets in group No. 2 (represented in block diagram) of the primary card translator input register 30. In the same fashion, the No. 3 terminals of the several operating banks are connected to the magnets in group No. 3, the fourth terminals to the magnets in the fourth group, the fifth terminals to the magnets in the fifth group, the sixth terminals to the magnets in the sixth group, and the seventh terminal in each of the operating banks 17—21 of the progress switch are connected to the corresponding magnets 41—45 in group No. 7 of the primary card translator input register 30. Since the winding of each electromagnet in the primary card translator input register is provided with a source of battery 46, the connecting of ground to the winding of any of these magnets over the above-described circuits will cause those magnets to operate. Each electromagnet is further provided with a set of contacts which are arranged to lock the electromagnet in an operated position over the off-normal ground lead 16. Thus, operation of the start key 11 (establishing the off-normal ground circuit) followed by the operation of key 1 connects ground over two parallel paths to the brushes of No. 0 bank 17 and No. 1 bank 18 of the progress switch over the previously discussed paths. Since the brushes of each of the banks are in contact with their respective No. 1 terminals, the circuits will be extended over the connecting leads to the windings of No. 0 electromagnet 31 and No. 1 electromagnet 32 in group No. 1 of the primary card translator input register 30, to battery 46, thus operating electromagnets 31 and 32 to register the digit "1." Electromagnets 31 and 32, in operating, close circuits from battery 46 through their front contacts to off-normal ground lead 16, thereby locking electromagnets 31 and 32 in operation to maintain the registration of the first-transmitted digit. Upon the release of key 1, step magnet 23 releases and the progress switch is set to the next position wherein the circuits of Fig. 1 are prepared to have the second digit of the call characteristics keyed up and registered in group No. 2 of the primary card translator input register 30. This sequence continues until the seventh digit is registered by operation of two of the five electromagnets 41—45 in group No. 7 of the primary card translator input register 30.

At this time the primary card translator is prepared to select a certain magnetic plate as determined by the particular code bars which have been operated. This may be accomplished by the operate magnet or magnets 47. This operate magnet may be controlled in a manner similar to that shown in the above-cited patent applications, i. e., each group of five code bar magnets in the primary card translator input register 30 may be provided with contacts additional to those disclosed in Fig. 1, with these additional contacts being suitably interconnected so that each group of five magnets also comprises a two-out-of-five check circuit. With the several check circuits in the register 30 connected in series with each other and in series with ground, the winding of operate magnet 47 and battery, operation of exactly two code bar magnets in each and every group will result in the energization of operate magnet 47 and the consequent selection of a single magnetic plate.

In the depicted embodiment of the invention, operate magnet 47 is energized under the control of an additional progress-switch bank 48. The brush of bank 48 may be grounded, and terminal No. 8 of bank 48 may be connected by means of conductor 49, through the winding of operate magnet 47, to battery. At the release of that key which has been depressed to register the seventh digit of the call characteristics, step magnet 23 will step each of the brushes into contact with its respective No. 8 terminal. When the brush of bank 48 contacts its No. 8 terminal, operate magnet 47 will be energized, and the selected magnetic card will be distinctively moved in relation to the remaining cards. Operate magnet 47 may be arranged to lock up to ground on off-normal ground lead 16, as shown. The translation then may be performed by the means disclosed in the above-cited patent applications, or by other suitable means.

Since the first seven digits represent the characteristics of the calling and called locations and of the class of call, these digits may be translated into a three-digit number representing a base rate between two locations as modified by the class of call, i. e., a modified base rate. This three-digit number may be registered in the three groups of five relays comprising the primary translator output register 50 shown in Fig. 2. The individual relays in the primary translator output register 50 are provided with contacts controlling energizing paths for corresponding electromagnets in the secondary card translator input register 51. Thus, operation of the No. 0 relay 52 in the first group of relays in the primary translator output register 50 will result in the operation of the No. 0 electromagnet 53 in the first group of electromagnets in the secondary card translator input register 51 over a path from ground on off-normal ground lead 16, front contact of operated relay 52, conductor 54, winding of the No. 0 electromagnet 53 in the secondary card translator input register 51, to battery 55. Similarly, other operated primary translator output register relays serve to operate the corresponding electromagnets in the secondary card translator input register, thereby transferring the results of the translation in the primary card translator to the code bar magnets of the secondary card translator. It is believed to be apparent that the output of the primary card translator could be channeled to directly operate the code bar magnets of the secondary card translator input register, if desired, thereby dispensing with the primary card translator output register relays.

The secondary card translator input register electromagnets lock operated over obvious circuits and actuate their corresponding secondary card translator code bars.

Figure 2:
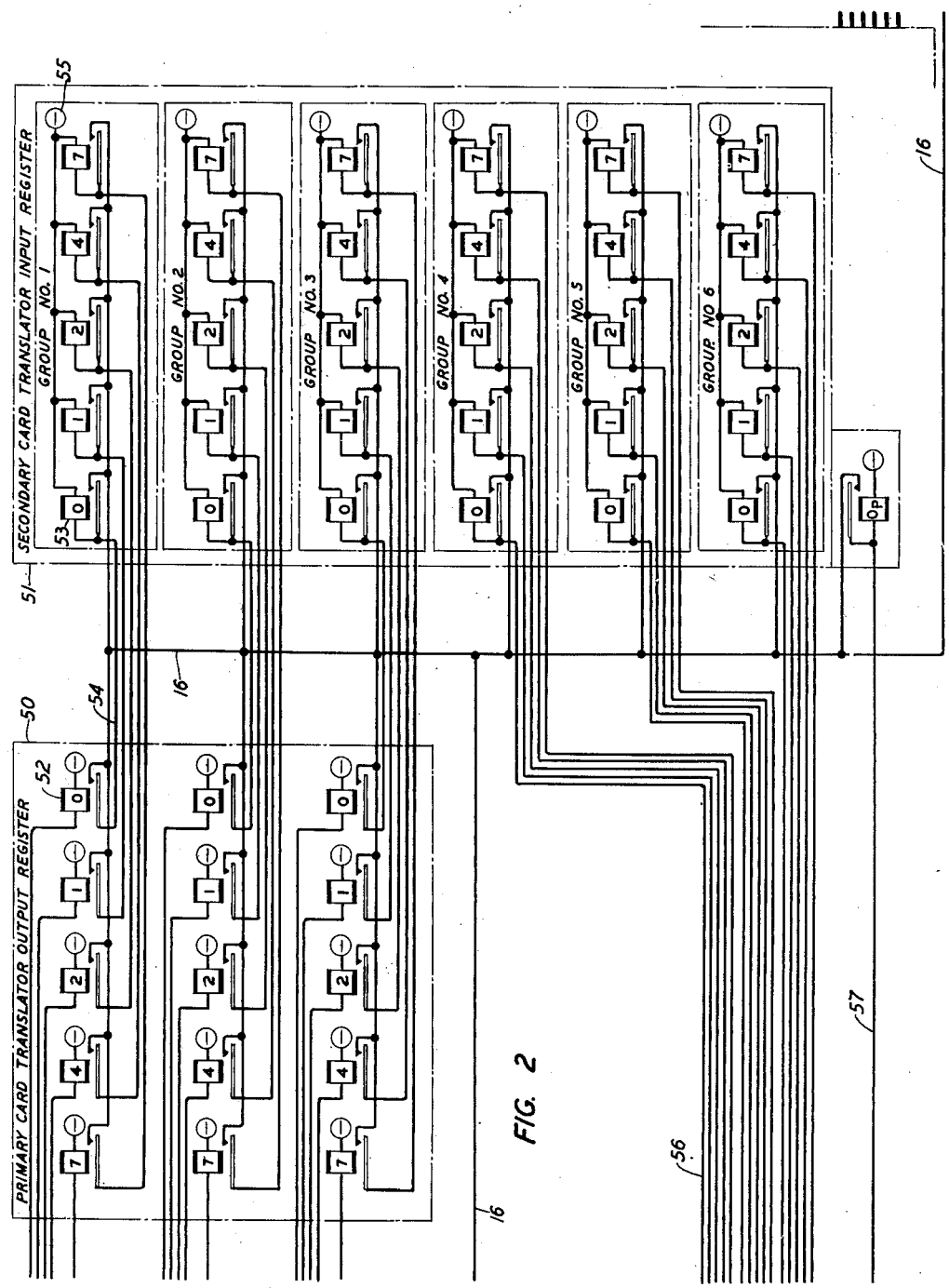
Fig. 2 shows the primary card translator output register and the secondary card translator input register.

The eighth, ninth and tenth digits, representing elapsed time, are registered directly in the secondary card translator input register 51. When these digits are successively entered in the key-set (Fig. 1), ground is transmitted through two of the five banks 17—21 of the progress switch while the brushes thereof are engaging the No. 8, No. 9, and No. 10 terminals, respectively. These terminals on each of the banks 17—21 are connected to the corresponding electromagnets in groups No. 4, No. 5, and No. 6, respectively, of the secondary card translator input register 51 (Fig. 2). For instance, terminal No. 8 of progress switch bank No. 0 is connected by conductor 56, through the windings of the No. 0 electromagnet in group No. 4 of the secondary card translator input register 51, to battery. Similarly, the No. 8 terminals of the Nos. 1, 2, 4, and 7 progress-switch banks 18—21 are connected to the Nos. 1, 2, 4, and 7 electromagnets of group No. 4, the No. 9 terminal of each bank 17—21 is connected to the corresponding electromagnet in group No. 5, and the No. 10 terminal of each bank 17—21 is connected to the corresponding electromagnet in group No. 6 of the secondary card translator input register 51. Thus, the entering of the eighth, ninth and tenth digits on the key-set results in the operation of two of the five electromagnets in each of the No. 4, No. 5, and No. 6 groups of the secondary card translator input register 51. These electromagnets lock to off-normal ground, and operate their associated code bars in the secondary card translator. Thus, the three digits representing the modified base rate and the three digits representing the elapsed time are registered in the secondary card translator input register.

When the key which has been depressed to register the tenth digit is released, step magnet 23 will step the brushes of the progress switch to engage their respective No. 11 terminals. When the brush of progress switch bank 48 contacts its No. 11 terminal, ground is conducted from the brush, over conductor 57, winding of operate magnet or magnets 58, to battery. The resulting operation of magnet or magnets 58 will result in the distinctive movement of that one of the perforated cards in the secondary card translator which has been selected through the operation of the code bars. Operate magnet or magnets 58 may be arranged to lock up to ground on off-normal ground lead 16, as shown. It is to be understood that the operate magnet or magnets 58 may be operated, if desired, through additional contacts on the code bar electromagnets as disclosed in the cited applications for Letters Patent as hereinbefore discussed, instead of by the additional progress-switch bank 48.

Upon the release of the tenth key to be depressed and the consequent stepping of the brush of the H bank 22 of the progress switch into contact with the No. 11 terminal thereof, the step magnet 23 is repeatedly and automatically operated to step all brushes around to their normal positions as hereinbefore described.

The function of the secondary card translator is to translate digits representing the modified base rate and the elapsed time into digits representing the monetary values of the charge and tax. Therefore, the secondary card translator is arranged to provide, in the present disclosure, a six-digit number, three of such digits representing the charge in dollars and cents, and the remaining three digits representing the tax thereon in dollars and cents. Although circuits to register but a three-digit number for each item have been disclosed, it is believed to be apparent from the drawings and the discussion thereof that by the provision of additional perforations in the cards and additional circuits associated therewith, an additional digit may be recorded for each item, viz., tens of dollars, and that, if desired, additional digits representing the total of charge plus tax may be recorded.

The output of the secondary card translator is represented, in Fig. 2, as the series of cables 59—64. These output cables each comprise five conductors whereby any digit may be represented by the grounding of two of the five leads by the secondary card translator. To record the results of the translation operation, these cables 59—64 may either be associated with a visual lamp display system, as disclosed in Figs. 3 and 4, or with a tape perforating system, as disclosed in Fig. 5.

Figure 3:
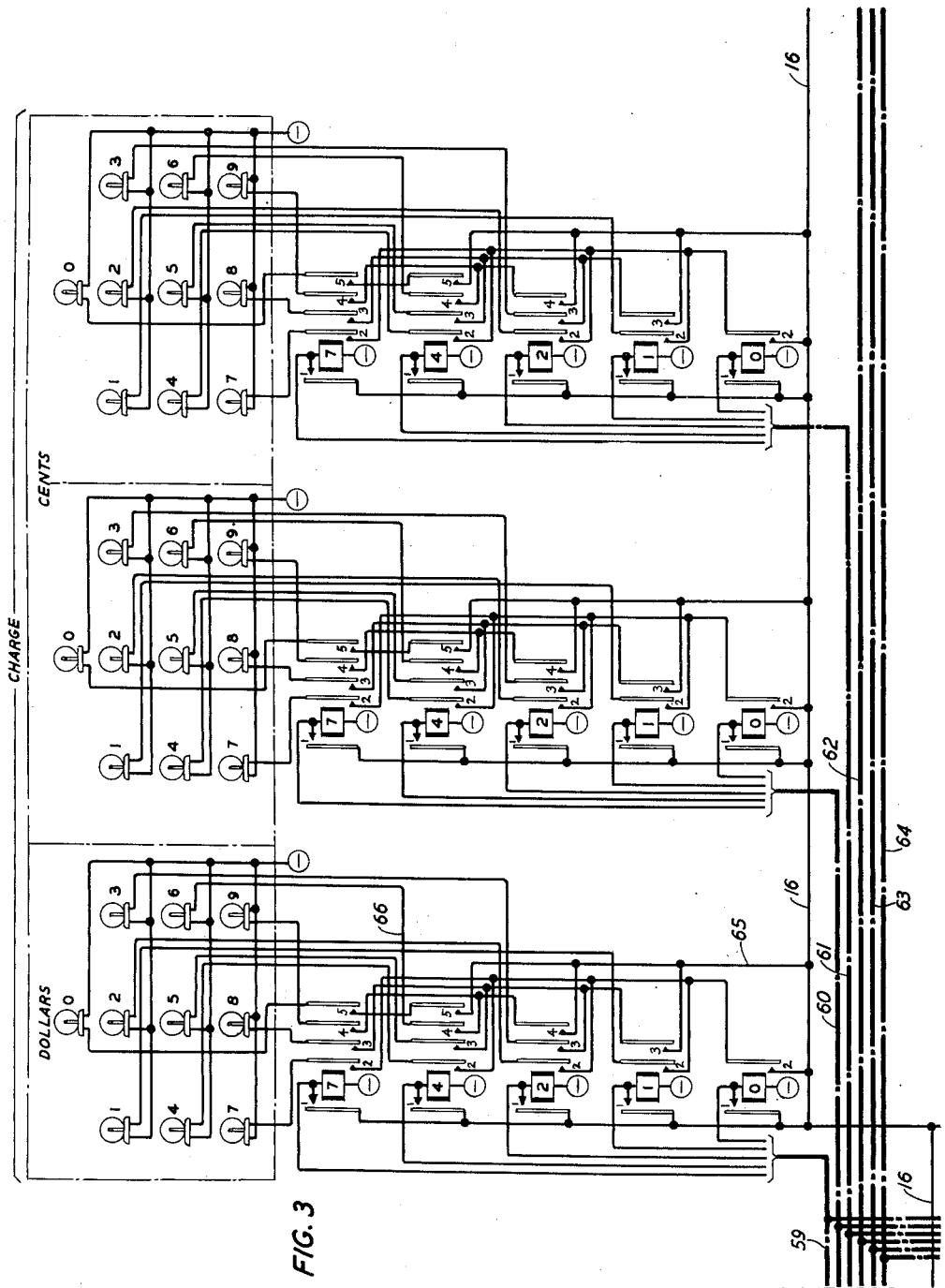
Figs. 3 and 4 show relay translator circuits and the visual display of the monetary values of the charge and tax.
Figure 4:
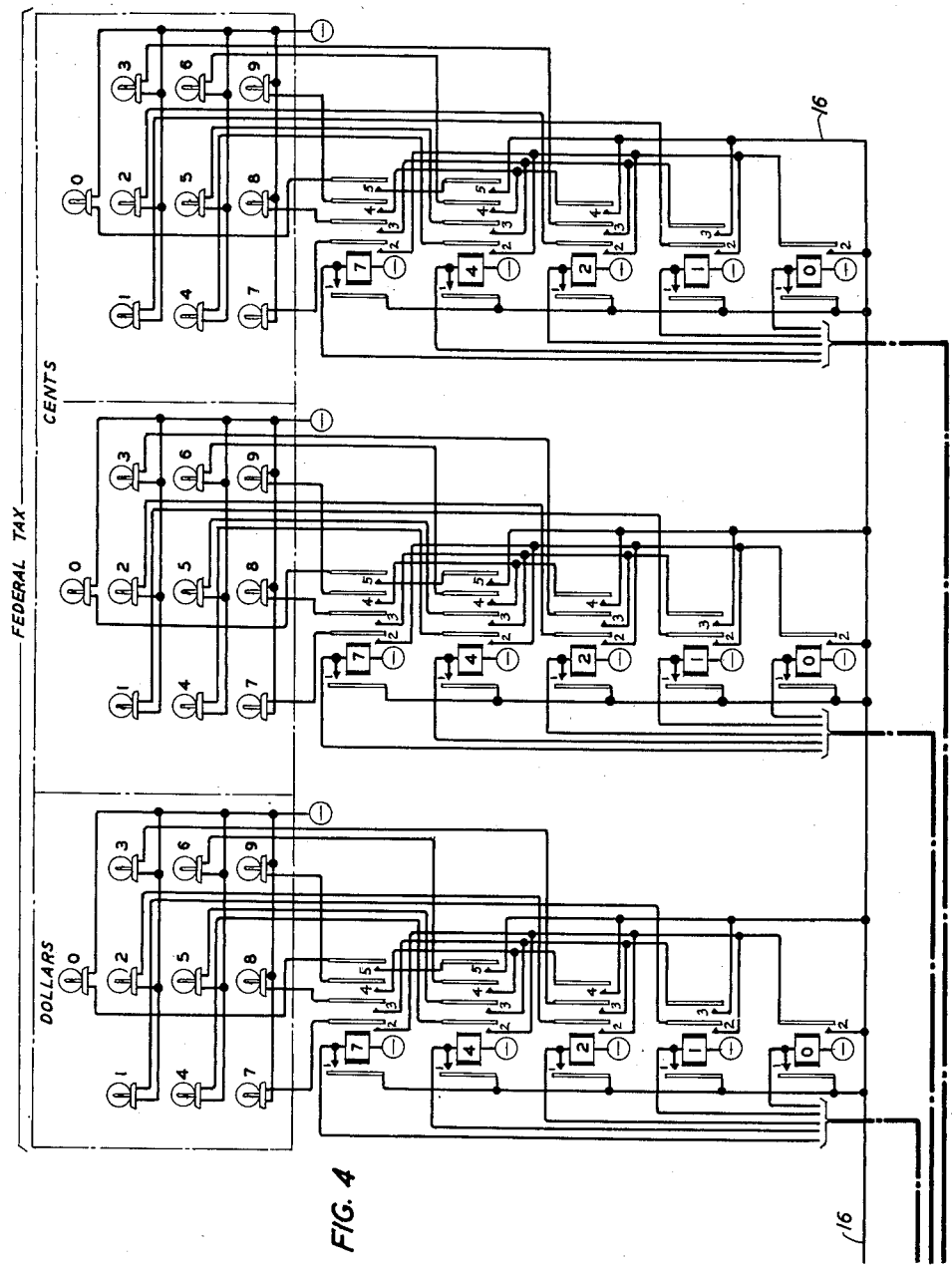

Referring now to the visual display system of Figs. 3 and 4, the five conductors of cable 59 are individually associated with relays in the charge-dollars register. Ground on any two of the conductors of cable 59 will be conducted through the windings of the corresponding relays in the charge-dollars register, and to battery. These two relays will lock-operate through their No. 1 contacts to off-normal ground on lead 16. The relays in the charge-dollars register are provided with contacts through which circuits may be closed from ground, through the selected one of the lamps in the charge-dollars register, to battery. Thus, if the No. 3 and No. 4 conductors in cable 59 are grounded to operate the No. 2 and No. 4 relays in the charge-dollars register, these relays in operating will close a circuit from ground on off-normal-ground conductor 16, conductor 65, No. 4 contact of the No. 2 charge-dollars relay, No. 4 contact of the No. 4 charge-dollars relay, conductor 66, charge-dollars lamp No. 6 and to battery. Lamp No. 6 is therefore lit to visually indicate that the charge on the call has that number as its dollars figure.

Similarly, the grounding of any two of the conductors in cable 60 and any two of the conductors in cable 61 will result in the lighting of the corresponding lamps in the charge-cents register thereby giving a complete visual indication of the total charge for the call in dollars and cents. Similarly, the grounding of two conductors in each of the cables 62, 63 and 64 by the secondary card translator will result in the lighting of three lamps in the federal tax registers (Fig. 4) to visually indicate the federal tax to be applied to the call. It will be noted that since each of the charge and federal tax register relays locks operated, the visual indication will remain displayed until ground is removed from off-normal-ground conductor 16.

Figure 5:
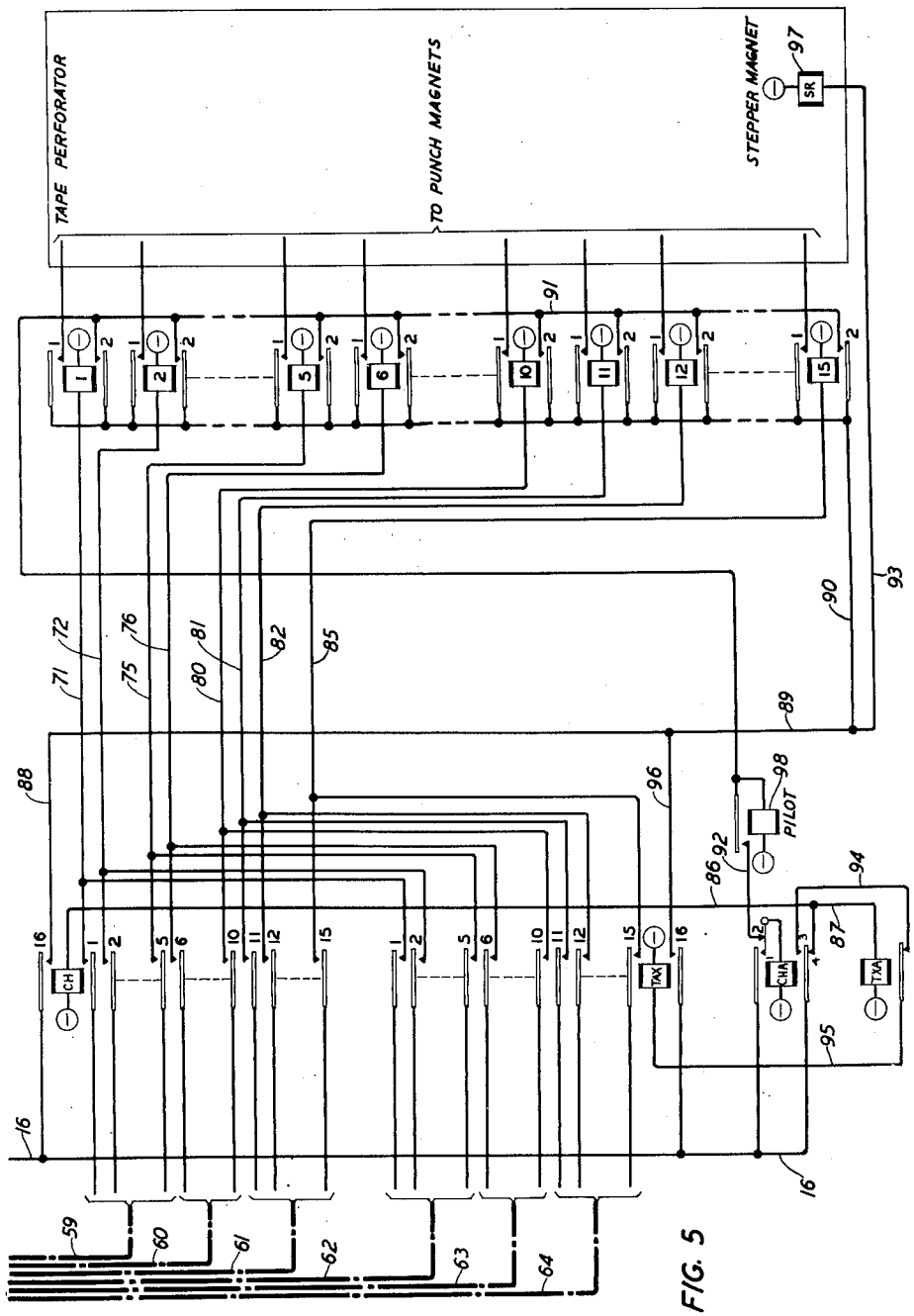
Fig. 5 is an alternative or additional register to that shown in Figs. 3 and 4 for recording the charge and tax as perforations in a tape.

The tape perforating recording system of Fig. 5 may be operated as an alternative to the lamp display of Figs. 3 and 4, or, as disclosed, may be operated additionally thereto. As shown in Fig. 5, the five conductors of cable 59 are connected to the Nos. 1—5 contacts of relay CH, the five conductors of cable 60 are connected to the Nos. 6—10 contacts of relay CH, the five conductors of cable 61 are connected to the No. 11—15 contacts of relay CH, and the conductors of cables 62, 63 and 64 are similarly controlled by the Nos. 1—15 contacts of relay TAX. The conductors through these several contacts of relays CH and TAX are then multiplied to form conductors 71—85, which are connected through the windings of relays 1—15 (Fig. 5), respectively, to battery.

At the beginning of operation, when the start key 11 (Fig. 1) is depressed, and ground is placed on off-normal-ground conductor 16, this ground is conducted through the No. 4 contacts of relay CHA (Fig. 5), over conductors 86 and 87, through the windings of relays CH and TXA, to battery. Relay CH, in operating, connects ground from off-normal ground conductor 16, No. 16 contact of relay CH, conductor 88, conductor 89, conductor 93, winding of stepper magnet 97, to battery. The stepper magnet operates but is arranged to advance the tape only upon release. Relay CH, in operating, also connects the conductors of cables 59, 60, and 61 through its Nos. 1—15 contacts to conductors 71—85 and thus to relays 1—15 and battery. Therefore, when two of the conductors in each of the cables 59—61 are grounded, representing the three "charge" digits, these grounds are passed over the associated conductor 71—85 to operate the associated relays 1—15. These relays, in operating, close paths from ground on off-normal ground conductor 16, No. 16 contact of relay, CH, conductor 88, conductor 89, conductor 90, No. 1 contact of each of the relays 1—15 which is operated, to the winding of the associate punch magnets of a key perforator of any well-known type. The three digits representing the charge for the call are thus perforated in a line on the tape. Operation of any one of the relays 1—15 also closes ground over the above-described path, through the No. 2 contacts of any of the relays 1—15 which are operated, conductor 91, to the winding of the pilot relay 98, and to battery. The pilot relay 98, which may provide a slight time delay, operates to extend the ground through conductor 92, No. 2 contacts of relay CHA, winding of relay CHA, to battery. Relay CHA, in operating, locks to off-normal ground on conductor 16 through its No. 1 contact. Relay CHA also releases relays CH and TXA by interrupting the above-traced energizing path for those relays at the No. 4 contacts of relay CHA. The release of relay CH interrupts the energizing path to relays 1—15 and thus releases the punch magnets. Relay CH, in releasing, also interrupts at its No. 16 contact, the energizing path for the stepper magnet 97, thereby advancing the tape in preparation for the perforating of the amount of the federal tax. It may be noted that the stepper magnet may be of the slow-release type to insure prior release of the punch magnets. The operation of relay CHA and the consequent release of relay TXA provides an energizing path for relay TAX which may be traced from ground on off-normal ground conductor 16, No. 3 contact of operated relay CHA, conductor 94, back contact of released relay TXA, conductor 95, winding of relay TAX, to battery. Relay TAX, in operating, closes the conductors of cables 62—64 through its Nos. 1—15 contacts to conductors 71—85, relays 1—15, and battery. Thus, ground on two of the five conductors of each cable 62—64 is conducted through to operate the associated relays 1—15, which operate the associated punch magnets to record the federal tax by perforations in the tape. Relay TAX, in operating, also closes off-normal ground through its No. 16 contact, over conductors 96, 89, and 93 to operate stepper magnet 97 in preparation for the advancing of the tape. The apparatus of Fig. 5 remains in this condition until the release key 12 of Fig. 1 is depressed. Operation of release key 12 interrupts the locking path for LU relay 14. LU relay 14, in releasing, removes ground from off-normal ground conductor 16, thus releasing all relays throughout the system which have lock-operated to off-normal ground. Relay CHA (Fig. 5), in releasing, releases relay TAX which releases the stepper magnet of Fig. 5 to advance the tape. The slow-release feature of the stepper magnet again permits the punch magnets to release, as the result of the release of the card translator magnets, prior to the time that the tape is advanced.

Thus, the charge and the tax have been visually displayed on the lamp display system of Figs. 3 and 4 so that the operator may report the charges and tax thereon to the customer if requested to so do, the charge and tax have been permanently recorded on perforated tape for subsequent processing, and the system has been released in preparation for the determination of the charge and tax on subsequent calls.

As many possible embodiments may be made of the above invention and as many changes may be made in the embodiment above set forth, it is to be understood that all matters hereinbefore set forth, or shown in the accompanying drawings, are to be interpreted as illustrative and not in a limiting sense.

What is claimed is:

1. A charge determining equipment for telecommunication systems comprising means for receiving characteristics of a connection, a first card translator responsive to said receiving means for translating certain of said characteristics to a modified base rate, a second card translator responsive to said first card translator and to said receiving means for translating other of said characteristics and said modified base rate into a monetary charge, and means for recording said charge.

2. A charge and tax determining equipment for telecommunication systems comprising means for receiving characteristics of a connection, a first card translator responsive to said receiving means for translating certain of said characteristics into a modified base rate, a second card translator responsive to said first card translator and to said receiving means for translating other of said characteristics and said modified base rate into a monetary charge and a tax thereon, and means for recording said charge and said tax.

3. A charge determining equipment for telecommunication systems comprising means for receiving characteristics of a connection comprising indications of the calling and called office, class of call, and elapsed time, a first card translator responsive to said receiving means for translating said indications of the calling and called office and class of call into a modified base rate, a second card translator responsive to said first card translator and to said receiving means for translating said indications of elapsed time and said modified base rate into a monetary charge, and means for recording said charge.

4. A charge and tax determining equipment for telecommunication systems comprising means for receiving characteristics of a connection comprising indications of the calling and called office, class of call, and elapsed time, a first card translator responsive to said receiving means for translating said indications of the calling and called office and class of call into a modified base rate, a second card translator responsive to said first card translator and to said receiving means for translating said indications of elapsed time and said modified base rate into a monetary charge and tax thereon, and means for recording said charge and said tax.

5. A charge determining equipment for telecommunication systems comprising a key-set for registering the characteristics of a connection, a first plurality of registering means, a second plurality of registering means, means controlled by said key-set for successively registering certain of said characteristics in said first plurality of registering means and for successively registering certain others of said characteristics in said second plurality of registering means, means controlled by said key-set for translating the characteristics registered in said first plurality of registering means and for registering the translated characteristics in said second plurality of registering means, apparatus controlled by said key-set for translating the said translated characteristics and the said certain others of said characteristics, and means controlled by said apparatus for recording the results of the translation by said apparatus.

6. A charge determining equipment for telecommunication systems comprising a key-set for registering the characteristics of a connection, a first plurality of registering means, a second plurality of registering means, means controlled by said key-set for successively registering certain of said characteristics in said first plurality of registering means and for successively registering certain others of said characteristics in said second plurality of registering means, means controlled by said key-set for translating the characteristics registered in said first plurality of registering means into a modified base rate and for registering said modified base rate in said second plurality of registering means, apparatus controlled by said key-set for translating the said modified base rate and the said certain others of said characteristics into a monetary charge, and means controlled by said apparatus for recording said monetary charge.

7. A charge determining equipment for telecommunication systems comprising a key-set for registering the characteristics of a connection, a first plurality of registering means, a second plurality of registering means, means controlled by said key-set for successively registering certain of said characteristics in said first plurality of registering means and for successively registering certain others of said characteristics in said second plurality of registering means, means controlled by said key-set for translating the characteristics registered in said first plurality of registering means and for registering the translated characteristics in said second plurality of registering means, apparatus controlled by said key-set for translating the said translated characteristics and the said certain others of said characteristics and for transmitting indications thereof, translating means controlled by said apparatus for translating said indications, and recording means controlled by said translating means.

8. A charge determining equipment for telecommunication systems comprising a key-set for registering the characteristics of a connection, a first plurality of registering means, a second plurality of registering means, means controlled by said key-set for successively registering certain of said characteristics in said first plurality of registering means and for successively registering certain others of said characteristics in said second plurality of registering means, means controlled by said key-set for translating the characteristics registered in said first plurality of registering means and for registering the translated characteristics in said second plurality of registering means, apparatus controlled by said key-set for translating the said translated characteristics and the said certain others of said characteristics and for transmitting indications thereof, translating means controlled by said apparatus for translating said indications, visual display means controlled by said translating means, and means controlled by said apparatus for recording said indications.

EDWARD VROOM.

REFERENCES CITED

The following references are of record in the file of this patent:

UNITED STATES PATENTS

| Number | Name | Date |
|---|---|---|
| 2,099,754 | Robinson | Nov. 23, 1937 |
| 2,255,147 | Broido | Sept. 9, 1941 |
| 2,288,520 | Geller et al. | June 30, 1942 |
| 2,332,304 | Davies | Oct. 19, 1943 |
| 2,385,007 | Leathers et al. | Sept. 18, 1945 |
| 2,434,500 | Leathers et al. | Jan. 13, 1948 |
| 2,477,722 | Coe et al. | Aug. 2, 1949 |

FOREIGN PATENTS

| Number | Country | Date |
|---|---|---|
| 578,077 | Great Britain | June 14, 1946 |